Patented Aug. 23, 1932

1,872,902

UNITED STATES PATENT OFFICE

HENRY L. CROWLEY, OF EAST ORANGE, NEW JERSEY, ASSIGNOR TO HENRY L. CROWLEY & CO. INC., OF EAST ORANGE, NEW JERSEY, A CORPORATION OF NEW JERSEY

METHOD OF PRODUCING MOLDED BODIES AND THE PRODUCT

No Drawing. Application filed December 7, 1929. Serial No. 412,563.

This invention relates in general to a method of producing molded bodies and the product produced thereby.

One of the objects of this invention is the provision of a method of making molded bodies from pure metals or their compounds.

Another object of this invention involves the method of making an extruded product from the jell of metals or their compounds.

Another object of this invention is the production of a molded body of any desired form from the jell of a metal or its compound and heat treating it.

Another object of this invention is the production of a molded body of any desired form from a powdered metal or metal compound mixed with the required amount of a jell of the same metal or metal compound as a binder and heat treating it.

Other objects of this invention involve products made by the above process which are less porous after heat treatment, have a minimum of extraneous materials therein and which, as a finished product, may have the desired chemical characteristics.

These and other objects, as will appear from the following disclosure, are secured by means of this invention.

This invention resides substantially in the combination, construction, arrangement, steps, and series of steps, all as will be pointed out in greater detail below.

This invention is related to the invention disclosed in my copending application Serial No. 332,555, filed January 14, 1929.

In the production of molded and heat treated bodies from metals and their compounds, such as oxides, hydroxides, carbonates, sulphates, carbides, and other chemical compounds thereof in powdered form, as disclosed in the above mentioned case, it is necessary to employ some form of binder to hold the molded product in shape with sufficient stability so that it may be handled in preparation for its first heat treatment. Obviously the use of binders of different chemical substances introduces extraneous materials of chemical characteristics which may or may not be desired in the finished product. The purpose of this invention is to eliminate the necessity for a foreign binder with the result that the product will have the desired chemical characteristics and will be free from undesired or extraneous materials.

The material, depending upon its use and other determining factors, may or may not be selected in accordance with the diagonal law of the periodic table, as disclosed in the above mentioned application. It will be apparent that this invention is not limited to the manner of selecting the material. The material selected in whatsoever manner will, of course, have the characteristics which it is desired the finished product to have. The selected metal or any suitable compound thereof in powdered form is mixed with a sufficient amount of jell of that metal or its compound to act as a binder. As an example if the powdered metal oxide is employed a jell of the metal oxide will be used in sufficient amount to act as a suitable binder for the powdered oxide. The mass is thoroughly mixed and then formed into the desired shape by extrusion in any well known manner. As the mixture is extruded under pressure the jell of the metal oxide acts as a binder so that after the particles are brought into forced mechanical cohesion with each other they are held there with sufficient force so that the extruded product may be handled. In another procedure of the invention the extruded product can be made entirely of the jell of a metal or its compounds if this be found desirable. The presence of the jell in both cases increases the slip of the material as it is extruded and aids in permitting easy flow thereof under pressure. By using a jell of the metal or its compound it is possible to get a smoother and more accurately sized product which is free from extraneous materials and has the desired chemical form. After extrusion the formed product is heat treated at the desired temperature and for the proper length of time depending upon the characteristics of the material to give it permanent form and shape. By employing the jell of a metal or its compounds it is possible to get a less porous product because an extraneous binder is not used and is hence not burned out during the heat treatment of the product.

The increased slip during the extrusion process is produced because of the fact that the material flows more easily under pressure which aids in giving the product its correct shape and size.

From the foregoing disclosure it will be apparent that I have devised certain improvements in the production of molded or extruded articles in accordance with certain principles of procedure which may be carried out by other ways without departing from the scope of this invention and I do not therefore desire to be strictly limited to the disclosure as given for purposes of illustration but rather to the spirit and scope of the appended claims. The invention is, of course, not limited to any particular form of molded article nor to any particular material employed, since any jell of any metal or any compounds thereof which may be made in jell form may be employed.

What I seek to secure by United States Letters Patent is:

1. A new composition of matter comprising a compressed and baked mixture of a powdered metal and a metal jell.

2. A new composition of matter comprising a mixture of a jell of a metal and the metal in a compressed and baked solid mass of low porosity.

3. A new composition of matter comprising a mixture of a jell of a metal and a powdered oxide of the same metal having its particles in forced mechanical cohesion.

4. A new composition of matter comprising a mixture of a jell of a metal compound and a powdered metal compound compressed and baked into a solidified mass.

5. A new composition of matter comprising a mixture of a jell of a metal compound and powdered metal in compressed form.

6. A new composition of matter comprising the mixture of a jell of a metal oxide and the same metal in powdered form in compressed and heat treated form.

7. A new composition of matter comprising an extruded jell of a metal oxide in a baked solidified mass.

8. The method of forming a molded product which comprises extruding the jell of a metal and baking the extruded mass.

9. The method of producing a new composition of matter which consists in subjecting the mixture of a jell of a metal oxide and a metal to pressure and heat.

10. The method of producing a new composition of matter which consists in subjecting a mixture of a jell of a metal compound and a powdered metal compound to pressure and heat.

11. A new composition of matter comprising a mixture of a jell of a same metal compound and the metal compound baked into a solidified mass.

12. The method of forming a molded product which comprises extruding the mixture of a powdered metal compound and the jell of a metal compound and baking the extruded mass.

13. The method of producing a new composition of matter which comprises subjecting a mixture of a powdered metal compound and the jell of the metal compound to pressure and heat.

14. The method of producing a new composition of matter which consists in subjecting powdered metal oxide and the jell of the metal oxide to pressure and heat.

In testimony whereof I have hereunto set my hand on this 6th day of December, A. D. 1929.

HENRY L. CROWLEY.